United States Patent
Ahlen et al.

(10) Patent No.: US 9,557,423 B2
(45) Date of Patent: Jan. 31, 2017

(54) DIRECTION SENSITIVE NEUTRON DETECTOR

(75) Inventors: Steven Ahlen, Wellesley, MA (US);
Peter Fisher, Cambridge, MA (US);
Denis Dujmic, Arlington, MA (US);
Hermann F. Wellenstein, Waltham, MA (US); Andrew Inglis, Brighton, MA (US)

(73) Assignees: Trustees of Boston University, Boston, MA (US); Massachusetts Institute of Technology, Cambridge, MA (US); Brandeis University, Waltham, MA (US)

( * ) Notice: Subject to any disclaimer, the term of this patent is extended or adjusted under 35 U.S.C. 154(b) by 1891 days.

(21) Appl. No.: 12/893,221

(22) Filed: Sep. 29, 2010

(65) Prior Publication Data
US 2017/0003405 A1    Jan. 5, 2017

Related U.S. Application Data

(63) Continuation of application No. PCT/US2009/041085, filed on Apr. 20, 2009.
(Continued)

(51) Int. Cl.
*G01T 3/00* (2006.01)
*G01T 1/16* (2006.01)
*G21C 17/00* (2006.01)

(52) U.S. Cl.
CPC ............ *G01T 1/16* (2013.01); *G21C 17/00* (2013.01)

(58) Field of Classification Search
CPC ............ G01T 3/00; G01T 3/006; G01T 3/08; G01T 3/06; G01T 3/008
See application file for complete search history.

(56) References Cited

U.S. PATENT DOCUMENTS

| 4,201,912 A | 5/1980 | Evans et al. |
| 4,286,158 A | 8/1981 | Charpak et al. |

(Continued)

OTHER PUBLICATIONS

Jerry B. Wilhelmy: "Neutral Current Detector Response and Calibration", Apr. 5, 1993.*
(Continued)

*Primary Examiner* — David Porta
*Assistant Examiner* — Mamadou Faye
(74) *Attorney, Agent, or Firm* — BainwoodHuang

(57) ABSTRACT

A neutron detector includes a pressure vessel, an electrically conductive field cage assembly within the pressure vessel and an imaging subsystem. A pressurized gas mixture of $CF_4$, $^3He$ and $^4He$ at respective partial pressures is used. The field cage establishes a relatively large drift region of low field strength, in which ionization electrons generated by neutron-He interactions are directed toward a substantially smaller amplification region of substantially higher field strength in which the ionization electrons undergo avalanche multiplication resulting in scintillation of the $CF_4$ along scintillation tracks. The imaging system generates two-dimensional images of the scintillation patterns and employs track-finding to identify tracks and deduce the rate and direction of incident neutrons. One or more photo-multiplier tubes record the time-profile of the scintillation tracks permitting the determination of the third coordinate.

13 Claims, 7 Drawing Sheets

Related U.S. Application Data

(60) Provisional application No. 61/124,614, filed on Apr. 18, 2008.

(56) References Cited

U.S. PATENT DOCUMENTS

| | | | |
|---|---|---|---|
| 4,317,038 A | 2/1982 | Charpak | |
| 5,223,717 A | 6/1993 | Charpak | |
| 5,347,131 A | 9/1994 | Charpak | |
| 6,259,763 B1 * | 7/2001 | Bitter | G01N 23/20 378/82 |
| 6,359,281 B1 | 3/2002 | Pawlak et al. | |
| 6,627,897 B1 | 9/2003 | Francke et al. | |
| 2002/0139935 A1 | 10/2002 | Klein et al. | |
| 2006/0056573 A1 | 3/2006 | McGregor et al. | |
| 2006/0163487 A1 | 7/2006 | Ambrosi et al. | |
| 2007/0225603 A1 | 9/2007 | Jackson | |
| 2008/0315108 A1 | 12/2008 | Stephan et al. | |

OTHER PUBLICATIONS

Dujmic, et al., "Observations of the head-tail effect in nuclear recoils of low-energy neutrons," published at http://www2.Ins.mit.edu/~LQS/CYGNUS-GS.ppt (Jul. 2007).

Fraga, et al., "CCD Readout of GEM Based Neutron Detectors," NIMPR (2002).

Sciolla, et al., "Observations of the head-tail effect in nuclear recoils of low-energy neutrons," published at http://www2.Ins.mit.edu/~LQS/CYGNUS-GS.ppt (Jul. 2007).

* cited by examiner

DIRECTION SENSITIVE NEUTRON DETECTOR

STATEMENT OF FEDERAL RIGHTS

The invention was made with government support under the following grants:
Grant No. DE-FG02-06ER41425 awarded by the Department of Energy;
Grant No. DE-FG02-05ER41385 awarded by the Department of Energy;
Grant No. PHY0653456 awarded by the National Science Foundation;
Grant No. 2008-DN-077-ARI006.03 awarded by the Department of Homeland Security; and
Grant No. DE-FG02-05ER41360 awarded by the Department of Energy
The government has certain rights in the invention.

BACKGROUND

The invention is related to the field of particle detectors, and in particular to neutron detectors.

It is known that fissile material emits so-called "fast" neutrons, i.e., neutrons with energy in the range of 1 MeV. For security purposes it may be desirable to employ neutron detection in order to detect the presence of fissile material which may pose a security threat. For example, detectors can be placed at points of entry of personnel or cargo, so that attempts to transport fissile material through such a point of entry can be detected and appropriate security measures taken. Neutron detection has also been used for other applications.

A paper of Fraga et al. entitled "CCD Readout of GEM Based Neutron Detectors" describes a gas neutron detector having a chamber with a mixture of carbon tetrafluoride ($CF_4$) and helium, along with so-called gas electron multiplier (GEM) plates which promote scintillation that is detected by a CCD camera. The GEM plates include a large number of small openings in which very high field strengths are maintained, so that ionization electrons entering these openings undergo rapid acceleration and induce scintillation of the $CF_4$ gas.

U.S. Pat. No. 6,627,897 of Francke et al. describes an apparatus for detection of ionizing radiation, wherein the incident radiation ionizes a substance, and the electrons released as a result thereof are accelerated in a dual parallel plate electrode arrangement. These electrons will interact with a scintillating substance to emit light, which is detected by a position sensitive light detector.

SUMMARY

A direction-sensitive neutron detector employs a gas-filled detector chamber with optical readout. The gas mixture includes carbon tetrafluoride ($CF_4$) and helium, specifically a relatively large quantity of $^4He$ which has a large elastic cross section for neutrons having energies of 1 MeV, which is typical of so-called "fast" neutrons emitted by fissile material such as plutonium. The $CF_4$ serves as a scintillation medium as well as an absorber of recoiling alpha particles caused by neutron-He interactions. Recoil nuclei leave trails of ionized electrons that drift to an "amplification region" of high field strength, where gas multiplication (avalanche) and scintillation take place. The scintillation light patterns are detected by an imaging system employing a charge-coupled device (CCD). Photomultiplier tubes can be used to time the entry of drift electrons into the amplification region, permitting together with the CCD image a three-dimensional reconstruction of the tracks and a corresponding accurate estimate of the direction of incident neutrons.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

The complete disclosure of U.S. Provisional patent application 61/124,614 filed Apr. 18, 2008 is incorporated by reference herein.

Figure 1:
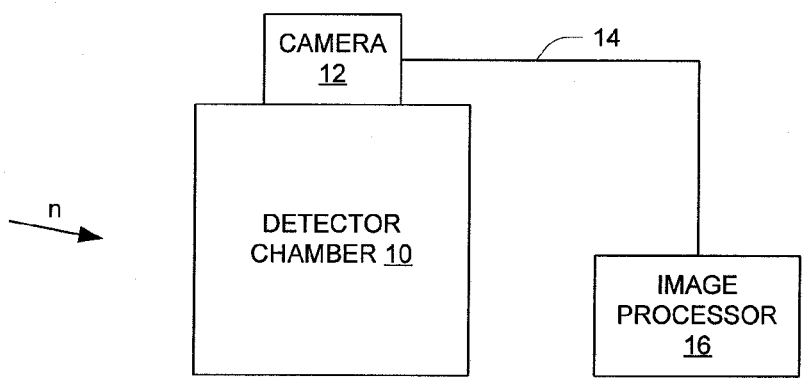
FIG. 1 is a schematic block diagram of a direction-sensitive neutron detector ("detector")

FIG. 1 is a schematic representation of a direction-sensitive neutron detection system. The system includes a detector chamber 10 which is filled with a gas mixture effective to interact with incident fast neutrons n (~1 MeV energy) and generate scintillation light which is recorded by a camera 12. Electronic camera output signals 14 are provided to an image processor 16 which performs a variety of image-processing tasks on the images represented by the output signals 14, including noise reduction and track-finding processes to identify "tracks" which result from neutron-He interactions and which provide information about the rate, energy, track length and direction of incident neutrons.

In particular, the detector chamber 10 employs a gas mixture including carbon tetrafluoride ($CF_4$) and two isotopes of helium, $^4He$ and $^3He$. $^4He$ has a large elastic cross section for recoiling from neutrons at 1 MeV, which makes it particularly suitable for detection of so-called "fast neutrons" emitted by fissile material. $^3He$ is better suited for interactions with so-called "thermal" neutrons. $CF_4$ serves as both a scintillation medium as well as a medium for limiting recoil track lengths, enhancing detection. $CF_4$ also has excellent properties pertaining to electron drift and amplification. In particular it is one of the best gases for limiting the transverse diffusion of drifting electrons. In one embodiment the detector chamber 10 is pressurized to a pressure of 3 bars or greater, and the gas mixture is about 95% helium (predominantly $^4He$) to 5% $CF_4$ by pressure. In particular, a mixture having the following proportions may be used: $CF_4$ at 40-120 Torr partial pressure, $^3He$ at 1 to 100 Torr partial pressure, and $^4He$ at 600-3000 Torr partial pressure.

Figure 2:
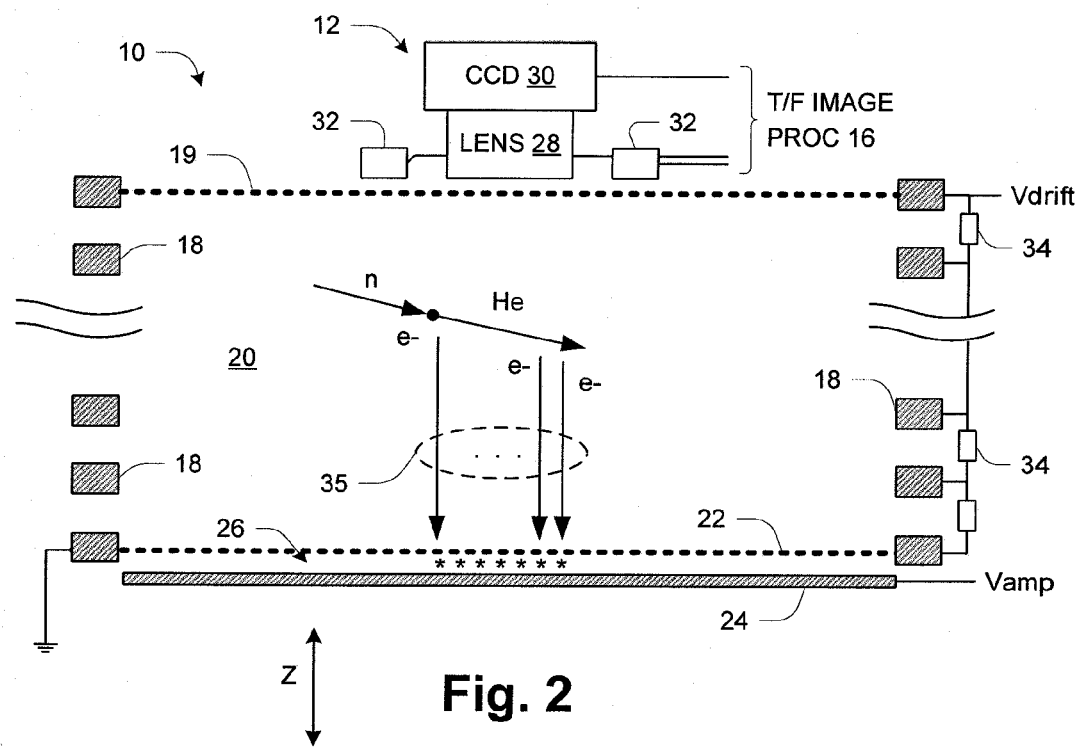
FIG. 2 is a schematic section side view of a detector chamber illustrating detector operation.

FIG. 2 is a schematic representation of the detector chamber 10. The detector chamber 10 encloses a volume, and FIG. 2 represents a side section view. For ease of reference, a Z axis is shown which defines a generally axial direction of the detector chamber 10. The detector chamber 10 may have a generally cylindrical shape and thus a circular or other cross section orthogonal to the Z axis, as more fully described below with reference to FIG. 3.

The detector chamber 10 includes a "field cage" having a plurality of stacked, spaced-apart conductive rings 18 orthogonal to the Z axis, along with an upper wire mesh or upper grid 19 at the top of a relatively large drift region 20. At the lower end is a lower wire mesh or lower grid 22 and a closely spaced conductive plate 24, which together define a much smaller amplification region 26. Voltages are applied as described below to establish a first, relatively low electric field in the drift region 20 and a second, relatively high electric field in the amplification region 26. The camera 12, which in the illustrated embodiment includes a lens 28 as well as a charge-coupled device (CCD) array, the light sensitive component of a cooled CCD camera 30, is located outside the upper end of the detector chamber 10. The detector may also include photomultiplier tubes (PMTs) 32 also at the upper end, two of which are shown in FIG. 2. The function of the PMTs 32 is described below.

In the illustrated embodiment the field in the drift region 20 is established by the combination of a ground potential on the lower grid 22 and a negative potential Vdrift applied to the upper grid 19 and the uppermost ring 18. A series of resistors 34 serve as a voltage divider network to distribute the voltage Vdrift across the rings 18. In one embodiment, the voltage Vdrift is −2500 volts, and the resistors 34 provide generally equally spaced voltages in the range between −2500 and 0 to the rings 18. As a simplified example to illustrate, if six rings are used then the sequence of ring voltages progressing downwards is −2500, −2000, −1500, −1000, −500 and 0. In a system it is expected that a larger number of rings (e.g. 20 to 30 or more) will be used to provide desirable spatial uniformity in the electric field within the drift region 20.

The field in the amplification region 26 is established by the combination of the ground potential on the lower grid 22 and a high positive potential Vamp applied to the plate 24. In one embodiment the voltage Vamp is +620 volts and the spacing between the lower grid 22 and plate 24 is 0.5 millimeters.

It will be appreciated that the electric fields are established by the relative voltages of the various elements. In alternative embodiments it may be convenient to apply the ground potential to another conductive node of the field cage.

In operation of the detection chamber 10, neutrons n entering the drift region 20 collide with He atoms of the gas mixture, each collision causing a recoil of a struck He nucleus in generally the same direction as the incident neutron. The large cross section at 1 MeV and the generally faithful agreement of the recoil direction with the neutron direction is due to the nuclear reaction of neutron+$^4$He proceeding through a resonant state of $^5$He. The recoiling He nucleus induces ionization along a short path or track of travel in the drift region 20. The free electrons generated by the ionization are directed toward the amplification region 26 under the influence of the field in the drift region 20 (shown generally as drifting electrons 35). As the electrons pass through the lower grid 22 they are accelerated by the high field in the amplification region 26. The accelerated electrons undergo avalanche multiplication which is accompanied by scintillation (emission of light) of $CF_4$ along paths in the amplification region 26, which are referred to as "scintillation tracks". The camera 12 together with the image processor 16 (FIG. 1) generate two-dimensional images of these scintillation tracks and process the images to identify those tracks generated by neutrons of interest, differentiated from other types of tracks and from other artifacts that may be created in operation.

It will be observed in FIG. 2 that the ionization track of the recoiling He may have a Z-direction component, which is not reflected in the path of scintillation occurring in the plane-like amplification region 26. In some embodiments the two-dimensional information from the scintillation tracks alone may be sufficient for identifying the direction of incident neutrons. However, in other applications it may be desirable to obtain information regarding the Z component of the ionization track. The PMTs 32 may be used for this purpose. The PMTs 32 are fast-response devices that provide an electrical output pulse for each scintillation, with the pulse duration being equal to the duration of the scintillation. To a first approximation, the duration of a pulse from a PMT 32 is directly proportional to the Z component of the ionization track whose scintillation light caused the pulse. By correlating the pulse shapes from the PMTs 32 with the appearance of scintillation tracks in the images obtained from the camera 12, the image processor 16 can include the Z component in its estimation of neutron direction. As described in more detail below, the estimation of direction is also based on the shape of the scintillation tracks.

Figure 3:
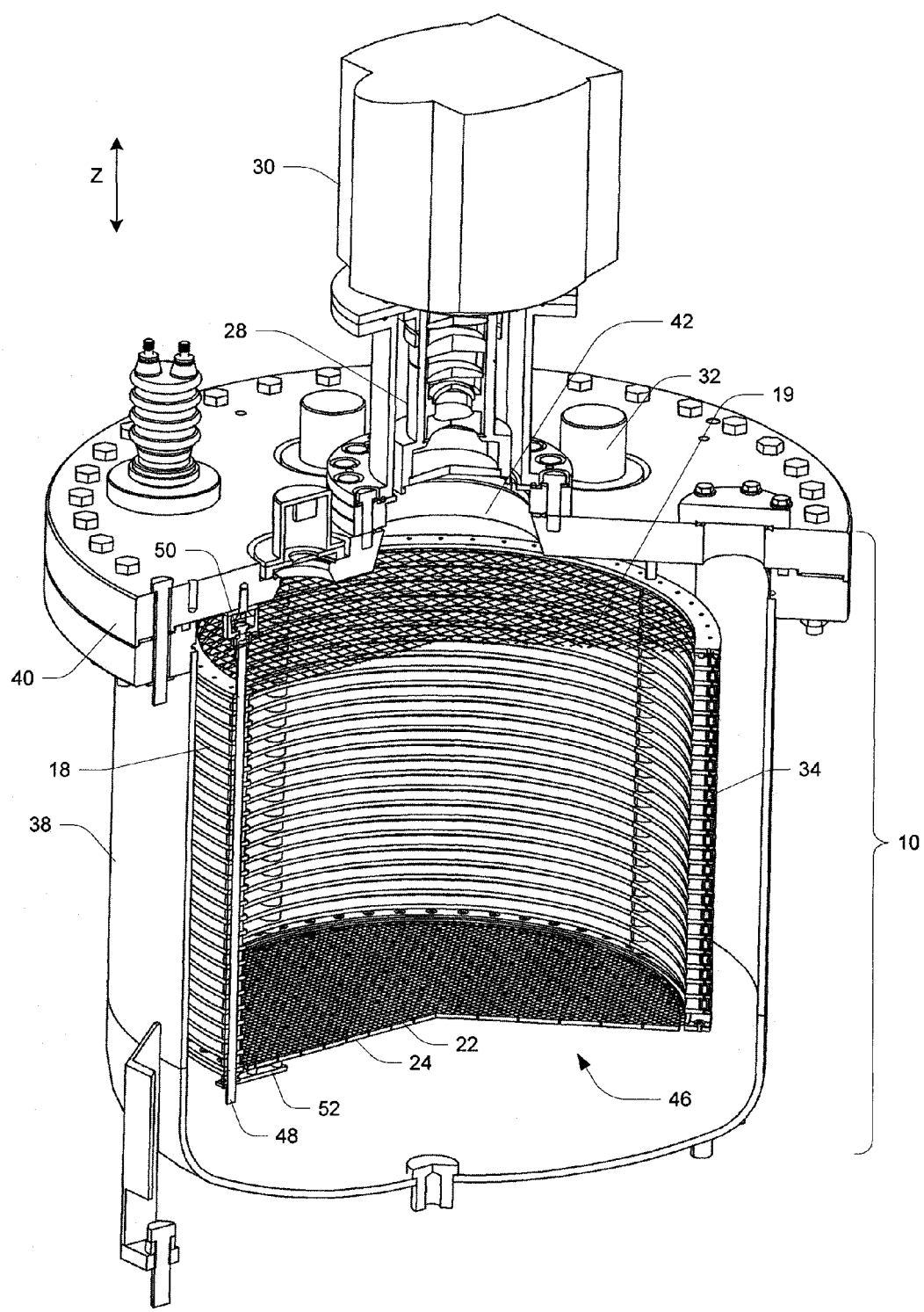
FIG. 3 is a perspective cutaway view of a physical implementation of a detector.

FIG. 3 shows a perspective section view of a physical implementation of the detector of FIGS. 1 and 2. The detector chamber 10 has an outer envelope defined by a steel pressure vessel including a dish-like bottom portion 38 and a cover 40 which is sealingly secured to the bottom portion 38. The cover 40 has a central opening 42 at which the lens 28 is mounted to receive light from the chamber interior. The opening 42 is preferably covered by an optically transparent window (e.g. glass, not shown) through which the CCD camera 30 receives the scintillation light from within the chamber 10. The interface between the window and the surrounding cover 40 is sealed so that the window forms part of the envelope of the chamber 10.

In the illustrated embodiment, the detector chamber 10 has a diameter of about 40 cm and a similar height. The lens 28 is designed to image the entire lower grid 22 in a substantially uniform manner onto the planar array of detector elements in the CCD camera 30. In one embodiment the lens 28 may have a 55 mm focal length and f/1.2, whereas in another embodiment the lens 28 have may an 18 mm focal length and f/0.93.

The CCD camera 30 is preferably a high-sensitivity CCD array for maximum light detection capability. In one embodiment a so-called "electron-multiplying" or EMCCD is used. These relatively new devices are particularly sensitive. EMCCDs employing back illumination can achieve quantum efficiency of greater than 90% in certain ranges of visible wavelengths along with very low noise.

A field cage assembly 46 includes the upper grid 19, the stack of spaced-apart rings 18 as well as the lower grid 22 and plate 24. Structural support is provided by a set of vertical rods 48 at regular angular spacing, for example four to six total. The rods 48 are coupled to the underside of the cover 40 by mechanical couplers 50. The plate 24 is secured to the rods 48 by shelves 52. As shown in more detail below, the lower grid 22 is held in place partly between two rings clamped together at its outer edge, and partly by a number of small insulating pillars distributed over—and inserted into—the upper surface of the plate 24. The required electrical connections to sources of the voltages Vdrift and Vamp are not shown in FIG. 3, but these may be made in any convenient fashion. The rings 18, upper grid 19, lower grid 22 and plate 24 are preferably of copper, due to its low concentration of uranium and thorium contaminants, and thereby its lower rate of alpha particle radiation that enters the drift region.

Figure 4:
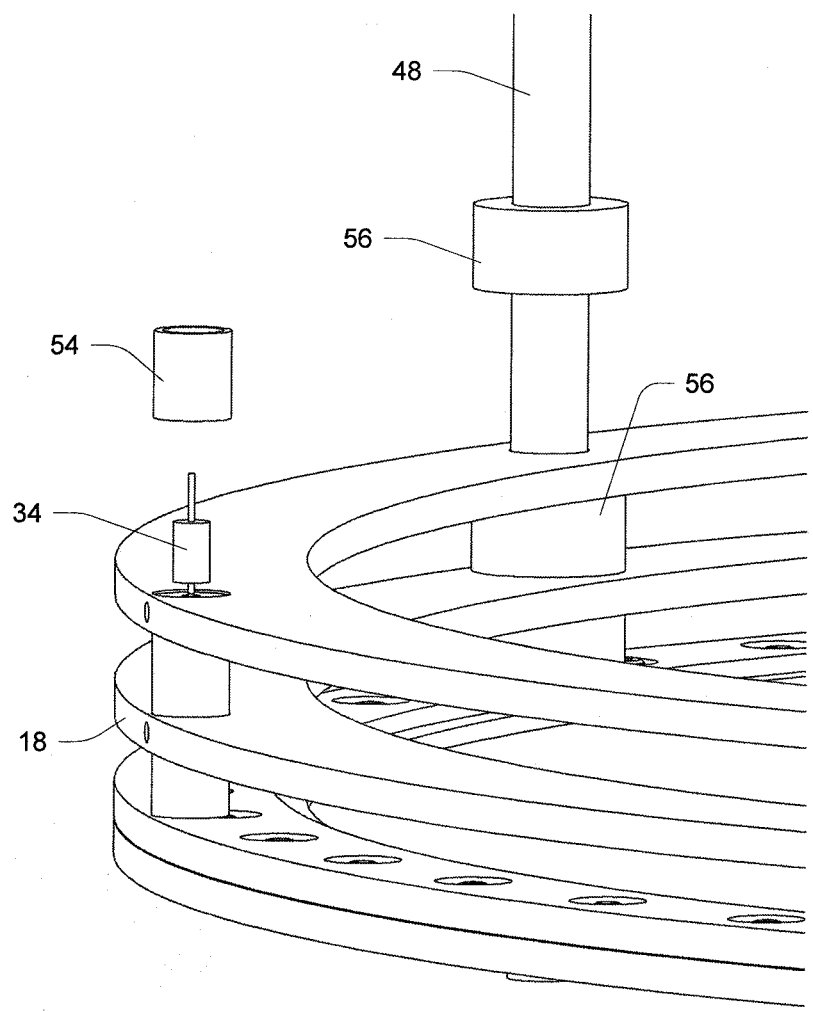
FIG. 4 is a detail view of spacers and voltage-dividing resistors used in a field cage assembly of a detector.

Turning to FIG. 4, one convenient method for mounting the resistors 34 is to employ set screws to clamp their leads directly into the rings 18 and enclose them with cylindrical insulating spacers 54 interspersed with the rings 18. The spacers 54 help block any alpha particles generated by the resistors 34 from entering the field cage. Returning briefly to FIG. 3, the resulting stack of resistors 34 can be seen in section at the right edge of the field cage assembly 46. Also shown in FIG. 4 is one of the rods 48, which extends through holes in the rings 18 as well as through insulating spacers 56 interspersed with the rings 18. In one embodiment, the spacers 54 and 56 as well as the rods 48 are preferably made from a highly stable polyimide-based plastic such as sold under the trademark VESPEL®. One significant advantage of this material is low outgassing, so that it contributes only minimally to any contamination of the gas mixture used in the chamber 10. Another advantage is that this material can be subjected to high temperatures, which enables the chamber to undergo a "vacuum bakeout" initialization to remove volatile contaminants from the chamber.

Figure 5:
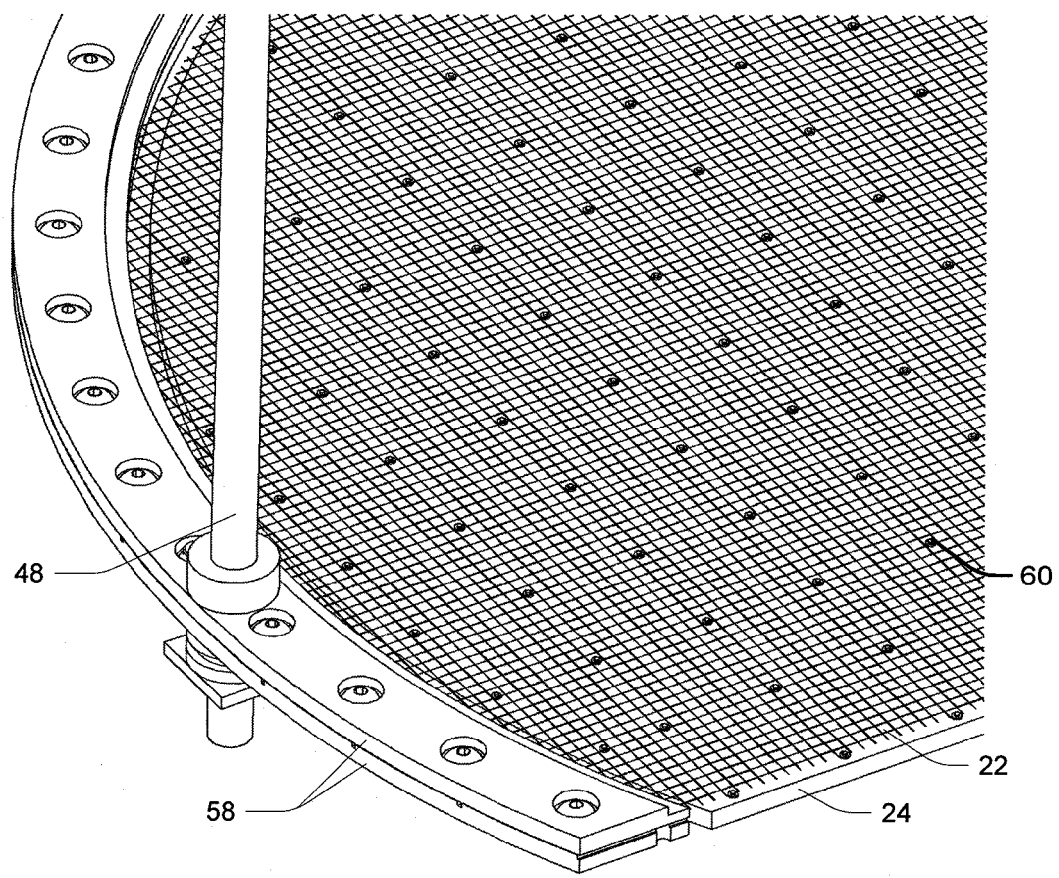
FIG. 5 is a detail view of an amplification region of a detector including narrowly spaced wire grid and anode plate.

FIG. 5 illustrates pertinent detail of the lower grid 22 and plate 24. The lower grid 22 is secured by a pair of rings 58 which are bolted together to compressively hold the outer edge of the lower grid 22. Insulating pillars 60 support the lower grid 22 across its lower surface, maintaining generally uniform spacing between the lower grid 22 and the plate 24. The pillars 60 are also preferably made of VESPEL® or similar polyimide material. In one embodiment the wires of the lower grid 22 have a pitch of approximately 4 per millimeter, with individual wires having a thickness on the order of 0.03 millimeter. It is desirable for both grids 19 and 22 to be as transparent as possible to the scintillation light which passes through the lower grid 22 and upper grid 19 to the camera 12.

Although not shown in FIG. 5, it may be desirable to substitute a grid of insulating wire-like strands for the pillars 60, to provide improved support for the lower grid 22. These strands may be formed of insulating material (such as quartz) and held in tension by the rings 58. Either the strands or the pillars 60 may introduce certain artifacts into the images captured by the camera 12, in which case the image processor 16 preferably includes special processing for removing or reducing such artifacts. For example, a true scintillation track may appear as two segments separated by a gap which corresponds to the location of a strand. The image processor 16 can correlate such gaps with the known fixed locations of the strands or pillars and identify the segments as respective parts of a single track. Preferably the strands or pillars are located in the image plane in an initialization operation in which the strands or pillars themselves are imaged and located in the imaging plane. This is in the nature of a setup operation occurring after completion of assembly of the detector.

Figure 6:
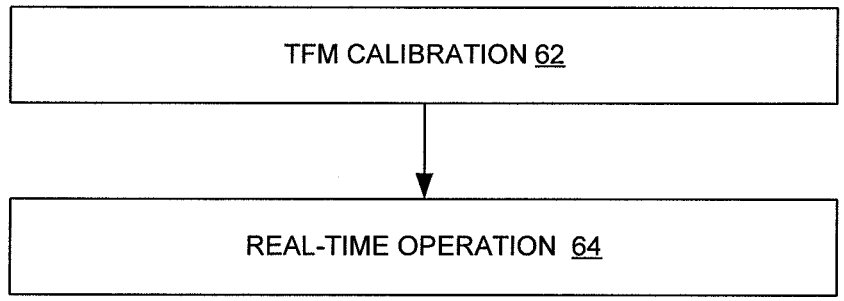
FIGS. 6-8 are flow diagrams of operation of an image processor including an automated image analysis algorithm as part of the operation of a detector.

FIG. 6 outlines certain operation of the image processor 16 which is referred to as an overall automatic analysis algorithm (OAAA). The basic function performed by the image processor 16 is track-finding, i.e., the identification of "tracks" or short paths of ionization particles based on patterns of scintillation light appearing in the images captured by the camera 12. It is noted that track-finding algorithms per se are generally known and thus not elaborated here. The OAAA is the algorithmic framework which transforms the unprocessed images into actionable information about the local neutron environment.

In operation of the detector, the interactions of incident neutrons with the gas results in ionized electrons that drift towards the amplification region 26, where scintillation light is emitted from the $CF_4$ and captured by the lens 28 and CCD 30. At given time intervals (e.g., once per second) the CCD 30 saves the exposures, thereby creating multiple images in time. The images are transferred to the image processor 16 in the form of output signals 14. The images generally consist of a background of low level (dark) pixel values, and one or more "tracks" (elongated segments or clusters of much brighter pixels values). The tracks vary in length and light intensity due to the varying interaction energies of the initial ionization and variation of the neutron entry angle into the gas chamber. As noted above, the track(s) may have breaks or gaps caused by the insulating strands supporting the grid 22 which block some light from entering the lens 28. Furthermore, there may be images that contain dead pixel information, "hot spots", or other track-like features that are of no interest ("worms", generally artifacts of the CCD 30 itself), and images that show sparking events, all things that can be confused with real track information in the images. Lastly, the image properties are heavily dependent on various parameters of the detector, such as the voltage potentials Vdrift and Vamp, the composition and partial pressures of the gas mixture, parameters of the lens 28 and the binning and exposure times of the CCD 30. The OAAA is the process to detect desired particle tracks from the detector in the presence of these kinds of artifacts and these variations of parameters and design specifications.

The OAAA uses a track finding module (TFM) in order to obtain the location of potential track or tracks of interest in the image. Each TFM includes a set of parameters (TFM Parameters) that define the way in which the TFM operates. Generally speaking, any of a variety of TFMs may be used.

In one embodiment the TFM operates in the following manner, where operation incorporates certain parameters as identified. The parameters control TFM operation and are the subject of tuning as described in more detail below.

1. The image is Gaussian blurred with a given kernel distance in order to accentuate the difference between the pixel intensities of the background and any potential tracks (parameter 1).
2. A threshold is applied which only selects pixels that are above a given pixel intensity (parameter 2). This process will select clusters of pixels that are potential tracks or portions of tracks.
3. Clusters below a given size are removed from further consideration, as they have a heightened probability of being random background clusters (parameter 3).
4. The end points of the remaining clusters are then determined. Clusters that have endpoints that are within a given distance are connected and treated as a single cluster (parameter 4).
5. At this time, if desired, the pixel intensities are corrected for the variations of light intensity due to the lens or any other aberrations within the chain of events between the recoil energy of the gas particle and the resultant pixel intensities.

6. The properties of the clusters (location of track pixels, total pixel light value, distribution of pixel light along length, length, width, track moments, direction of track) are then collected.

The TFM parameters for this TFM as numbered above include: (1) Gaussian kernel distance, (2) threshold value, (3) minimum cluster size deletion, and (4) maximum distance to connect clusters.

As shown in FIG. 6, the OAAA includes steps of TFM calibration 62 followed by real-time operation 64. These two phases of operation are described in turn.

Figure 7:
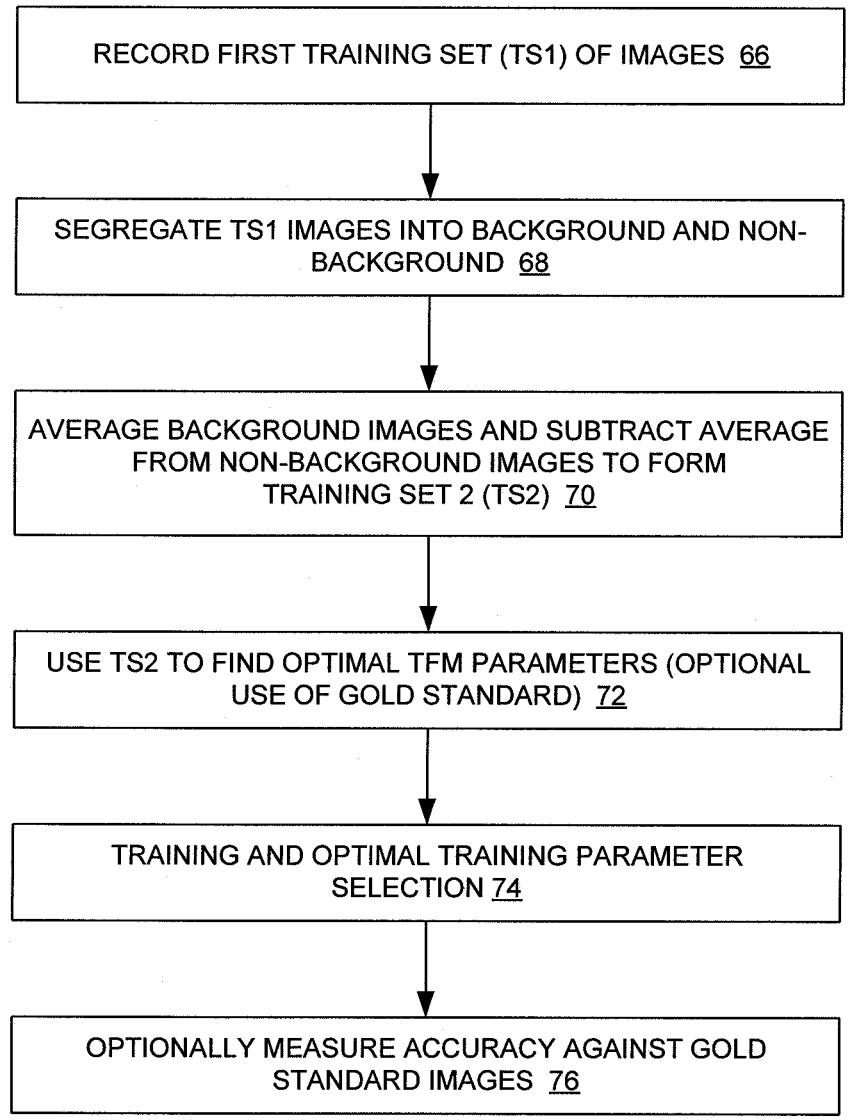

Referring to FIG. 7, TFM calibration 62 includes a set of steps, which may be repeated for each unique set of experimental parameters (i.e., drift voltage, gas cocktail, CCD parameters, etc.), and for each unique environment that the detector will be used within (i.e., with or without neutron sources), enabling the complete characterization of the tracks that will be detected in regular use. This calibration is performed prior to the initial real-time usage of the device. It may also be necessary to be re-performed after the device has been in service from changes due to regular wear of the camera, gas, or device geometry.

In a first step 66 a set of images are recorded from the camera 12 for a given set of device parameters (drift voltage, gas cocktail, exposure time, CCD type, CCD binning, etc.). These images are called the first training set (TS1). This set will include background images with no tracks as well as images with tracks. The TS1 can also come from Monte Carlo created images that exactly match the real world scenario that the detector will be used.

In step 68 the images in TS1 are segregated into two categories: images that potentially have one or more tracks (referred to as "possible" or non-background images), and images that do not potentially have any tracks (background). The procedure for this segregation is to blur each image and record the largest pixel intensity value in the image. If the value is above a given threshold, then it has a potential track. The thresholds used in this phase are generally not very susceptible to variations in the device parameters and thus are treated as fixed rather than tunable parameters.

In step 70 the background images are averaged into a single image and subtracted from the non-background images to form a second training set TS2.

In step 72 the optimal TFM parameters are found. This can be performed by visually scanning through TS2 images and adapting the TFM parameters manually so that the TFM covers all tracks of interest within the images, then saving the optimal TFM parameters. It can also be performed in a more systematic way by creating a "gold standard" set of tracks within a subset of TS2 images (marking the locations of tracks) and running an algorithm that searches for a set of TFM parameters that maximize the number of "true positives" (tracks that should have been found) and minimizes the "false positives" (objects that shouldn't be found) found in the gold standard images.

In step 74 the TFM with optimal TFM parameters is then applied to all TS2 images, and all track properties are then analyzed in a multi-dimensional plotting program. The user then makes cuts on the found set that are not tracks of interest. The track parameters (such as curvature, overall light intensity, shape, direction/origin of track) of true positives and false positives are compared and a machine learning algorithm of varying complexity (simple track parameter cuts, nearest neighbor algorithms, neural network algorithms, etc.) with appropriate parameters is selected in order to maximize the discrimination between true positives and false positives. This step is referred to as Training and optimal Training Parameter selection. It can also be performed in the "gold standard" guise of automation if such a decision was made in step 72.

The entire process of image normalization, application of TFM with optimal TFM parameters, and training with optimal training parameters is called the total track finding algorithm (TTFA)

In step 76, the TTFA may optionally be applied to a unique "gold standard" set of tracks selected from a different sample of images in order to measure the final accuracy using true positive and false positive results. If the accuracy is not acceptable, the TTFA process can be refined in any of its submodules (TFM selection, optimal TFM parameter selection, track parameters used in training, training method, or training method parameters) until accuracy is acceptable.

After TFM calibration 62 as outlined above, the neutron detector is ready to be used. It is noted that in order to be used in real-time applications, the execution time of the TTFA must be less than the image exposure or acquisition time. In one embodiment images are acquired at a rate on the order of one per second, while the TTFA requires only 1/100th of a second on a circa-2008 Pentium®-based laptop computer, thereby passing this criteria for real-time use.

Figure 8:
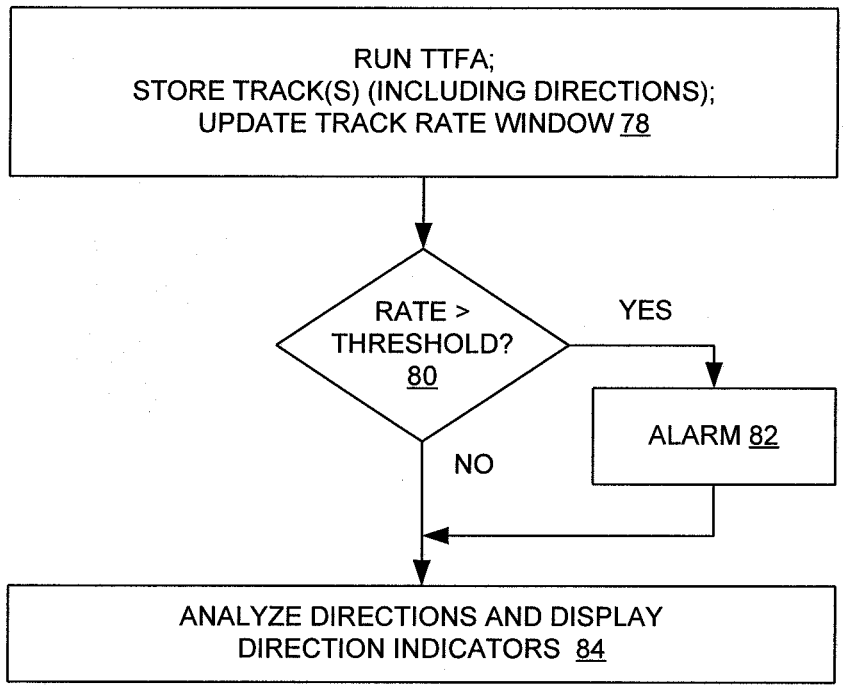

FIG. 8 outlines the process of real-time use, which is repeated once for each image provided to the image processor 16 by the camera 12. At step 78 the TTFA is applied, and any tracks that are identified are stored (including information regarding the direction of the tracks). Also, a running track rate window is updated, which is a time-based window used to measure the recent track rate. At step 80, the measured track rate is compared with a threshold to determine whether the track rate is sufficiently high to activate an alarm that a potential neutron source is nearby. If so, then the alarm is activated at step 82. In addition, at step 84 tracks are accumulated to gather statistics used to determine the direction a source is located in a plane perpendicular to the imaging plane.

It should be noted that the detector can be used to collect track information only within a particular azimuthal angle of interest, which may be useful if the device is scanning items at only known positions with respect to the device, thereby reducing the potential background due to other sources of neutrons. In these kinds of applications the detector may also collect tracks within an azimuthal angle located 180 degrees opposite, which may include reflections of neutrons from such sources. In order to increase the rate of reflection neutrons reentering the detector from this reflection angle and thereby increase overall efficiency, it may be desirable to use the detector in front of a structure having high neutron reflectance properties (such as a concrete wall).

Figure 9:
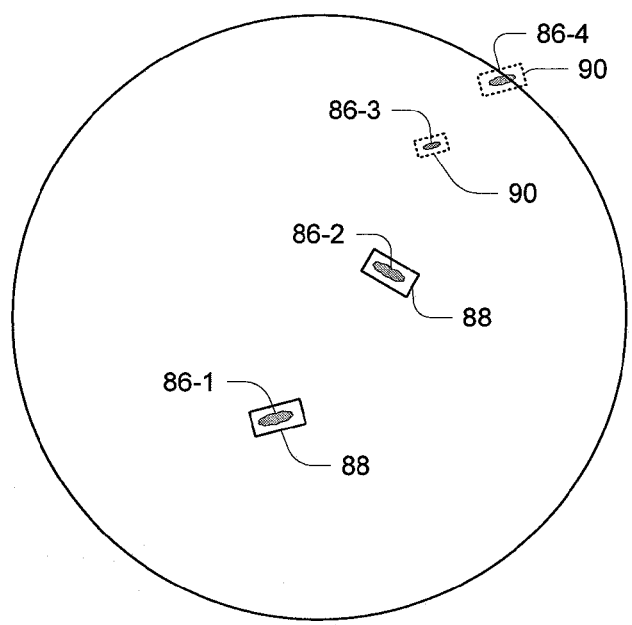
FIGS. 9 and 10 are diagrams of displays showing icons representing tracks and other pertinent items identified or derived during operation of the detector.
Figure 10:
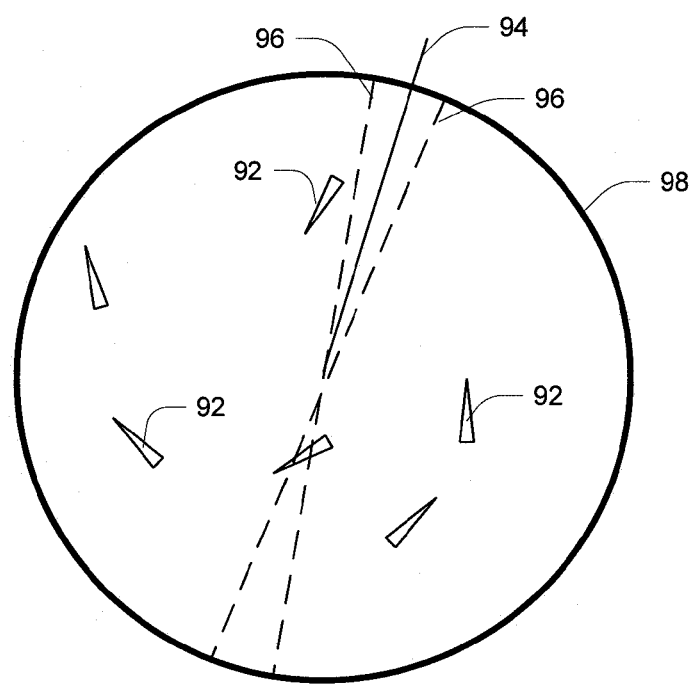

FIGS. 9 and 10 provide one embodiment of a visualization of detection results in operation of the neutron detector. As each image is outputted from the camera 12, the image is analyzed using the TTFA. Clusters of bright pixels that pass the criteria given by the training method are selected as tracks, and clusters that do not pass the criteria are discarded.

Referring to FIG. 9, clusters 86-1 and 86-2 are identified as tracks (indicated by solid rectangles 88, and clusters 86-3 and 86-4 are deemed not to be tracks and discarded (indicated by dashed rectangles 90). FIG. 10 shows a display having numerous tracks accumulated over a time span of operation. The tracks are identified as elongated triangular icons 92, each pointing in a direction calculated for the track.

The TTFA can ascertain track direction based on the track properties of track energy and lengthwise position of the highest light level of the track (known as the Bragg peak) with respect to the track end positions. In one embodiment of this logic, using a mixture of 40 Torr $CF_4$ and 600 Torr $^4$He gas, $^4$He recoil tracks below an energy of ~1.8 MeV are traveling in the direction from the Bragg peak towards the farthest-from-Bragg peak end of the track, and $^4$He recoil tracks above the energy of ~1.8 MeV are traveling in the direction from the farthest-from-Bragg peak end of the track towards the Bragg peak. The directions of the tracks are statistically analyzed to ascertain a "highest probable direction" of a source, which is indicated by a direction line 94. Error bars 96 provide an indication of uncertainty (variance) of the direction line 94. An outer circular icon 98 can be used to provide an indication when the track rate is above the pre-set threshold discussed above, such as by changing its color and/or increasing its brightness and/or size.

It is desirable that the neutron detector be capable of use for an extended period with minimal need for operational support or maintenance. This may be challenging when considering the need for a high-purity gas environment within the chamber 10 to achieve high performance. To reduce the presence of impurities that can impair performance over time, it may be desirable to perform a vacuum baking operation of the chamber 10 for an extended period prior to placing it in operation. A temperature on the order of 300 degrees C. may be used. This baking operation liberates impurities. One benefit of the VESPEL® material for the spacers 56 etc. is its ability to withstand such high temperatures without experiencing chemical or mechanical degradation. Other materials that may be employed include quartz and glass (insulators) and copper and stainless steel (conductors and/or structural components like the vessel members 38, 40). It is noted that copper and Vespel in particular have low radioactive background and thus reduce the level of alpha particles in the chamber which can reduce sensitivity. By using a vacuum baking process, it may be possible to use the detector in the field for relatively long periods (e.g., up to a year) with minimal maintenance. The detector can be serviced as necessary at these long intervals, for example to replenish the gases, inspect the seals and repair/replace seals or other components as necessary.

While various embodiments of the invention have been particularly shown and described, it will be understood by those skilled in the art that various changes in form and details may be made therein without departing from the spirit and scope of the invention as defined by the appended claims.

For example, although the detector chamber 10 is described as cylindrical with a circular cross section, in alternative embodiments other cross-sections may be used (such as elliptical or polygonal), and in other alternatives it may be desirable to use a non-cylindrical shape (such as conical). Regarding applications or uses, it is envisioned that the detector may be part of a passive detection system which detects neutrons generated by a nearby source (such as contraband fissile material etc.), but in other applications the overall system may be an active system which includes a neutron source directed at target objects and in which the detector detects neutrons that are backscattered from such objects. These kinds of systems can be used to detect materials such as uranium and hydrogen-based explosives for example.

More specifically, the neutron detector can be used in conjunction with a pulsed particle detector to detect the presence of $^{235}$U. In such a system, operation of the neutron detector is triggered electronically shortly after a momentary source of neutrons is produced by the pulsed particle accelerator. Specifically, the voltages Vdrift and Vamp are applied and the camera 12 and image processor 16 are activated to capture and process one or more images in succession. The neutrons are directed at a container that holds unknown or suspected cargo (e.g., a shipping container, truck, railway car or similar container). If $^{235}$U is present, the neutrons stimulate fission of the $^{235}$U to thereby produce fission decay neutrons, which are detected and identified by the neutron detector both in energy and direction as being indicative of the presence of the $^{235}$U. There is a small time delay between the accelerator pulse and the activation of the detector to discriminate between prompt neutrons from the accelerator source and the delayed neutrons from the sample.

In another application, a detection system includes the neutron detector as well as a gamma ray detection system and a pulsed particle accelerator. Operation is similar to that described above, except that the neutrons also stimulate the emission of gamma rays from nitrogen, carbon and oxygen that may be present within the container. The gamma rays are detected by the gamma ray detection system. The neutrons are backscattered at low energy by hydrogen within the container, and the backscattered neutrons are detected and identified by the neutron detector both in energy and direction. The coincident detection of the gamma rays and the backscattered neutrons is indicative of materials with composition consistent with that of high explosives or illegal drugs.

What is claimed is:

1. A neutron detector, comprising:
a pressure vessel having a pressurized gas mixture of $CF_4$, $^3$He and $^4$He at respective partial pressures, a first partial pressure ratio of $CF_4$ to $^3$He being substantially 1:1 or greater, and a second partial pressure ratio of $^4$He to $CF_4$ being substantially 15:1 or greater, the pressure vessel having first and second opposite ends, the first end having an optically transparent window;
an electrically conductive field cage assembly within the pressure vessel, the field cage assembly being configured and operative to establish first and second electric field regions in the pressure vessel, the first electric field region being a relatively large drift region of relatively low field strength in which ionization electrons generated by neutron-He interactions are directed toward the second electric field region, the second electric field region being a substantially smaller region of substantially higher field strength at the second end of the pressure vessel in which the ionization electrons undergo avalanche multiplication resulting in scintillation of the $CF_4$ along scintillation tracks; and
an imaging subsystem including (1) a camera at the optically transparent window of the first end of the pressure vessel, the camera being operative in response to scintillation light from the amplification region to generate camera output signals representative of a sequence of images captured by the camera, and (2) an image processor operative to process the camera output signals in real time to (a) identify the scintillation tracks and (b) based on the identification of the scintillation tracks, estimate a rate and direction of incident neutrons.

2. A neutron detector according to claim 1 wherein the pressure vessel and field cage assembly include only materials that enable a vacuum baking operation at an elevated temperature of at least substantially 250 degrees C. without experiencing chemical or mechanical degradation inconsistent with subsequent normal use of the neutron detector.

3. A neutron detector according to claim 2 wherein the field cage assembly includes conductive components of copper and insulating components of a high-stability polyimide plastic.

4. A neutron detector according to claim 2 wherein the field cage assembly includes a planar wire grid and a closely spaced conductive plate which define the amplification region, and wherein a plurality of insulating pillars or parallel insulating rods or both are distributed throughout the amplification region to maintain a substantially uniform separation between the planar wire grid and the conductive plate.

5. A neutron detector according to claim 1 wherein the camera comprises a lens and an electron-multiplying charge-coupled device (EMCCD) array, the lens uniformly imaging the amplification region onto the EMCCD array.

6. A neutron detector according to claim 1, further comprising one or more photomultiplier tubes operative to generate output pulses corresponding to the duration of scintillation light and therefore a z component of ionization tracks in the detector chamber, the z component being parallel to a direction of drift of the ionization electrons, and wherein the image processor is operative to correlate the output pulses of the photomultiplier tubes with the scintillation tracks to determine the z component of motion of detected neutrons.

7. A neutron detector according to claim 1 wherein the image processor is operative to perform an automatic analysis process including:
 capturing a first training set of images and calculating background images as well as non-background images from the first training set of images;
 calculating an average background from the background images and subtracting the average background from the non-background images to form a second training set of images;
 engaging in a training process to identify an optimal set of track-finding parameters for a track-finding module based on the second training set of images; and
 subsequently executing the track-finding module with the optimal set of track-finding parameters on images captured by the camera in operational use of the neutron detector.

8. A neutron detector according to claim 7, wherein the training process includes executing the track-finding module on a first gold standard set of training images with known tracks, and further comprising measuring accuracy by executing the automatic analysis process with the optimal set of parameters on a second gold standard set of images, the second gold standard set of images being separate from and not overlapping with the first and second training sets of images.

9. A neutron detector according to claim 7 wherein the image processor is further operative to implement real time analysis of events within the neutron detector including:
 selecting neutron recoil tracks of interest and rejection of tracks from other sources and artifacts of the device;
 determining a relative direction of incident neutrons based on track energies and relative light levels within the tracks;
 determining whether the number of tracks within a running time average denotes the presence of a nearby potential neutron source; and
 gathering track statistics to determine a direction of a neutron source in a plane perpendicular to an imaging plane.

10. A neutron detector according to claim 1 wherein the image processor is further operative to find either (1) an azimuthal direction with respect to the neutron detector of an unknown neutron source, or (2) a potential neutron source within a particular azimuthal direction with respect to the neutron detector, with increased signal to noise ratio by rejecting neutrons from sources in other azimuthal directions.

11. A neutron detection system comprising the neutron detector according to claim 10 and a structure having high neutron reflectance properties, the structure being located adjacent to the neutron detector 180 degrees from the particular azimuthal direction.

12. A $^{235}$U detection system including the neutron detector of claim 1 and a pulsed particle accelerator, wherein operation of the neutron detector is operative to be triggered electronically in conjunction with a momentary source of neutrons produced by the pulsed particle accelerator, the neutrons being capable of stimulating fission of $^{235}$U in a shipping container, truck, railway car or similar container to thereby produce fission decay neutrons that are identifiable by the neutron detector both in energy and direction as being indicative of the presence of the $^{235}$U.

13. A detection system including the neutron detector of claim 1 as well as a gamma ray detection system and a pulsed particle accelerator, wherein operation of the neutron detector is operative to be triggered electronically in conjunction a momentary source of neutrons produced by the pulsed particle accelerator, the neutrons being capable of (1) stimulating the emission of gamma rays from nitrogen, carbon and oxygen, the gamma rays being detectable by the gamma ray detection system, and (2) being backscattered at low energy by hydrogen, the backscattered neutrons being identifiable by the neutron detector both in energy and direction, the coincident detection of the gamma rays and the backscattered neutrons being indicative of materials with composition consistent with that of high explosives or illegal drugs.

* * * * *